US006936364B2

(12) United States Patent
Reinke et al.

(10) Patent No.: US 6,936,364 B2
(45) Date of Patent: Aug. 30, 2005

(54) METHOD AND APPARATUS FOR VAPORIZING FUEL FOR A REFORMER FUEL CELL SYSTEM

(75) Inventors: Michael J. Reinke, Franklin, WI (US); Jonathan Wattelet, Gurnee, IL (US); Mark Voss, Franksville, WI (US); Uwe Benz, Uhldingen-Mühlhof (DE); Bruno Motzet, Weilheim/Teck (DE); Alois Tischler, Dorfen (DE); Marc Weisser, Owen/Teck (DE)

(73) Assignees: Modine Manufacturing Company, Racine, WI (US); XCELLSiS GmbH (DE)

( * ) Notice: Subject to any disclaimer, the term of this patent is extended or adjusted under 35 U.S.C. 154(b) by 420 days.

(21) Appl. No.: 10/000,860

(22) Filed: Oct. 24, 2001

(65) Prior Publication Data

US 2003/0077490 A1 Apr. 24, 2003

(51) Int. Cl.[7] .......................... H01M 8/18; H01M 8/04; F28D 7/00; B01J 10/00; B01J 8/04

(52) U.S. Cl. ............................. 429/20; 429/26; 429/34; 429/19; 429/17; 422/191; 422/193; 422/200; 422/198

(58) Field of Search .............................. 429/20, 26, 34, 429/19, 17; 422/191, 193, 200, 198

(56) References Cited

U.S. PATENT DOCUMENTS

| | | | | |
|---|---|---|---|---|
| 2,566,310 A | | 9/1951 | Burns et al. | |
| 4,623,019 A | | 11/1986 | Wiard | |
| 5,401,589 A | | 3/1995 | Palmer et al. | |
| 5,823,252 A | | 10/1998 | Waitkat et al. | |
| 6,159,434 A | * | 12/2000 | Gonjo et al. | 422/191 |
| 2001/0030041 A1 | | 10/2001 | Boneberg et al. | |

FOREIGN PATENT DOCUMENTS

| | | |
|---|---|---|
| DE | 3508240 | 9/1986 |
| EP | 0 206 608 | 12/1986 |
| EP | 0 861 802 | 9/1998 |
| EP | 0952419 | 10/1999 |
| JP | 2-120205 | 7/1990 |

* cited by examiner

*Primary Examiner*—Tracy Dove
*Assistant Examiner*—Angela J. Martin
(74) *Attorney, Agent, or Firm*—Wood, Phillips, Katz, Clark & Mortimer

(57) ABSTRACT

Rapid response to a fuel cell system of the type including a reformer (32) in response to a change in load is achieved in a system that includes a fuel tank (24), a water tank (20) and a source (42) of a fluid at an elevated temperature. A heat exchanger (28) is provided for vaporizing fuel and water and delivering the resulting vapor to the system reformer (32) and includes an inlet (64) and an outlet (66) for the fluid. It includes a plurality of fluid flow paths (100), (102), (104) extending between the inlet (64) and outlet (66) as well as a fuel inlet (56) and a fuel outlet (58) spaced therefrom. The fuel inlet (56) and outlet (58) are connected by a plurality of fuel flow paths (52) that are in heat exchange relation with the fluid flow paths (100), (102), (104) and the fuel water inlet (56) is located adjacent the upstream ends of the fluid flow paths (100), (102), (104).

7 Claims, 5 Drawing Sheets

METHOD AND APPARATUS FOR VAPORIZING FUEL FOR A REFORMER FUEL CELL SYSTEM

FIELD OF THE INVENTION

This invention relates to fuel cell systems of the type including a reformer that creates a hydrogen rich gas for use in the fuel cell from a liquid fuel whose composition includes hydrogen. More specifically, the invention relates to the vaporization of the fuel prior to its admission to the reformer.

BACKGROUND OF THE INVENTION

Recent years have seen a marked increase in interest in fuel cell for the generation of electric power. One area where interest is high is in the design of propulsion systems for vehicles. As is well known, a typical fuel cell combines hydrogen and oxygen to generate electricity which may then be used to power an electric motor which can be used to provide propulsion for a vehicle.

While such systems have held promise for many years, most have been out of reach from the practical standpoint in that they require the vehicle to carry hydrogen as the fuel. The provision of oxygen for the fuel cell reaction is not a problem in that it is readily available from ambient air. In any event, early proposals required that hydrogen be carried in liquid form or in gaseous form at extremely high pressures. In either case, the vessels for carrying the hydrogen were large, heavy and cumbersome in comparison to fuel tanks for vehicles powered by internal combustion engines.

Moreover, there was and is no infrastructure in place to provide for the fueling of vehicles with liquid hydrogen or hydrogen under high pressure to allow widespread use of fuel cells in vehicles. And if that were not enough, where liquid hydrogen is considered as the fuel, considerable expense in terms of equipment necessary to assure vaporization of liquid hydrogen so that it can be used by the fuel cell is a further drawback. Consequently, fuel cell systems to date have been non-competitive with conventional internal combustion engine propulsion systems.

More recently, in order to solve the above difficulties, there have been a variety of proposals of fuel cell systems employing a so-called reformer. Reformers are chemical processors which take an incoming stream of a hydrocarbon containing or hydrocarbon based material and react it with water to provide an effluent that is rich in hydrogen gas. This gas, after being further treated to rid it of fuel cell poisoning constituents, most notably carbon monoxide, is then provided to the anode side of a fuel cell. Ambient air is provided to the cathode side of the fuel cell. The oxygen in the air and the hydrogen in the anode gas are reacted to provide water and generate electricity that may be used to power a load such as an electric motor.

The reformer must receive the fuel and water in vapor form. Consequently, if the disadvantage of high pressure vessels associated with some pure hydrogen fuel cells is to be avoided, some means of carrying the fuel in a liquid form in a tank comparable to gasoline or diesel fuel tanks must be provided along with the means for vaporizing the water and the fuel prior to its admission to the reformer. While for many non-vehicular applications, the matter of vaporizing the water and the fuel may be handled relatively simply, the problem is much more difficult where the production of electricity by the fuel cell is expected to respond rapidly to a change in electrical load. In the vehicular context, this means that the fuel cell must respond rapidly to changes commanded by the driver of the vehicle through changes in the position of the fuel cell equivalent of a conventional gas pedal.

It has been determined that the rapidity of response of the fuel cell to a commanded change depends on the mass of water and fuel in the vaporizer that feeds vaporized water and fuel to the reformer. The greater the mass of fuel and water in the vaporizer, the longer the response time. Consequently, it has been determined that to be effective in fuel cell systems powering loads which require rapid response to a change in conditions that the mass of fuel and water in the vaporizer be held to an absolute minimum. To meet this requirement, it is highly desirable that the fuel and water side of the vaporizer have as small a volume as possible.

In vehicular applications, it is also highly desirable that the overall vaporizer be as small in size as possible in terms of volume and in weight. Bulk and weight are highly disadvantageous in that weight reduces the overall fuel efficiency of the vehicle and bulk reduces the load carrying capacity of the vehicle to the point that it is impractical to provide a vehicle that can compete with conventionally powered vehicles in use today. It is also desirable to achieve a very short system start-up time.

The present invention is directed to overcoming one or more of the above problems.

SUMMARY OF THE INVENTION

It is the principal object of the invention to provide a new and improved fuel cell system of the reformer type and more particularly, an improved fuel vaporizer for use in a reformer fuel system. It is also an object of the invention to provide a new and improved method for vaporizing fuel for use in a fuel system of the type including a reformer.

According to one facet of the invention, there is provided a method of vaporizing liquid fuel and water prior to its introduction into a reformer in a fuel cell system. The method includes the steps of a) causing a stream of hot fluid to traverse a flow path such that the fluid is at maximum temperature at the beginning of the flow path and at a lower temperature at a location downstream of the beginning of the flow path, b) vaporizing the liquid water and fuel by bringing liquid water and liquid fuel into heat exchange relation with the stream of hot fluid at the beginning of that stream and flowing the water and fuel concurrently with the stream and in heat exchange relation therewith to the downstream location; and c) subsequently flowing the vaporized water and fuel in heat exchange relation and countercurrent with the stream of hot fluid back to the beginning and out of contact with flow of water and fuel occurring during the performance of step b) to superheat the vaporized water and fuel. Steps a), b) and c) are performed in a continuous operation.

According to a preferred embodiment, step c) is followed by the step of directing the vaporized and superheated water and fuel to a reformer in a fuel cell system.

In a highly preferred embodiment, the fuel is methanol.

According to another facet of the invention, there is provided a fuel cell system that includes a fuel reservoir for storing a liquid fuel for a fuel cell, a fuel cell for consuming fuel and generating electricity therefrom, and a fuel reformer connected to the fuel cell for providing the fuel thereto for consumption therein. The fuel reformer receives fuel in a vaporized state. A fuel vaporizer is interposed between the fuel reservoir and the fuel reformer for receiving liquid fuel from the fuel reservoir and vaporizing the liquid fuel to the vapor state for delivery to the fuel reformer. The fuel vaporizer includes a heat exchanger having a hot fluid inlet, a hot fluid outlet and a core interconnecting the inlet and the outlet. The core has alternating hot fluid passages and extending between the hot fluid inlet and the hot fluid outlet in heat exchange relation with liquid/vaporized fuel passages. The hot fluid passages each are defined by two, elongated spaced, generally parallel bars, a fin or fins between the bars extending the lengths thereof and two separate sheets bonded to and sandwiching the bars and the fin(s). The heat exchanger further includes a liquid fuel inlet and a vaporized fuel outlet. Each of the liquid/vaporized fuel passages extend between the liquid fuel inlet and the vaporized fuel outlet and include an undulating spacer nested between generally parallel bar sections and separator sheets bonded to and sandwiching the spacer to define a plurality of flow ports of relatively small hydraulic diameter.

In one embodiment of the invention, most, but not all, of the separator sheets are located within the core and each of such separator sheets is common to adjacent ones of the hot fluid passages and the liquid/vaporized fuel passages.

In a preferred embodiment, the fin or fins may be of the lanced and offset variety.

In one embodiment, the bars, the bar sections, the lanced and offset fins, the separator sheets and the undulating spacers are bonded together by braze metal.

A preferred embodiment contemplates that the core be a stack of bars, bar sections, lanced and offset fins, separator sheets and undulating spacers arranged to define the alternating hot fluid passages in heat exchange relation with the liquid/vaporized fuel passages.

A preferred embodiment also contemplates that the undulating spacer be in plural sections and that the bar sections are oriented with respect to the undulating spacer sections to define multi-pass liquid/vaporized flow passages, at least one pass of the multi-pass liquid/vaporized fuel passages being in countercurrent relation to the hot fluid passages.

In one embodiment, at least one other pass of the multi-pass liquid/vaporized fuel flow passages is in concurrent relation to the hot fluid passages.

Preferably, the one pass is connected to the vaporized fuel outlet and the other pass of the multi-pass liquid/vaporized fuel flow passages is connected to the liquid fuel inlet.

In a highly preferred embodiment, the cross-sectional area of the one pass connected to the outlet is greater than the cross-sectional area of the pass connected to the inlet.

Preferably, the hot fluid inlet and the hot fluid outlet are each pyramid shaped and have an open base connected to the core.

The invention also contemplates a fuel vaporizing system for use in a fuel cell propulsion system which includes a source of liquid fuel, a source of water, and a source of fluid at an elevated temperature. Also included is a heat exchanger for vaporizing fuel and water and delivering the resulting vapor to a reformer. The heat exchanger has an inlet for the fluid and an outlet for the fluid spaced therefrom. The inlet is connected to the fluid source. A plurality of fluid flow paths extend between the fluid inlet and the fluid outlet and have upstream ends at the fluid inlet and downstream ends at the fluid outlet. A fuel/water inlet and a fuel/water outlet which is spaced from the fuel/water inlet are connected by a plurality of fuel/water flow paths that are in heat exchange relation with the fluid flow paths. The fuel/water inlet is connected to the fuel and water sources and located adjacent the upstream ends of the fluid flow paths.

Preferably, the fuel/water flow paths are multiple pass flow paths with an upstream most one of the fuel/water flow paths flowing concurrent with the fluid flow paths and a downstream most one of the fuel/water flow paths flowing countercurrent to the fluid flow paths.

In a highly preferred embodiment, the heat exchanger is a plate heat exchanger including a stack of separate sheets defining a configuration of fluid flow paths and fuel/water flow paths in alternating relation, and turbulators are disposed in the fluid flow paths.

One embodiment of the invention contemplates that the fuel/water flow paths are flattened and have a major dimension and a minor dimension with the minor dimension being 1.0 mm or less. Preferably, the minor dimension is about 0.5 mm.

Other objects and advantages will become apparent from the following specification taken in connection with the accompanying drawings.

DESCRIPTION OF THE PREFERRED EMBODIMENTS

An exemplary embodiment of the invention will be described herein in the environment of intended use in a vehicle and one which utilizes methanol as a hydrogen containing liquid that is combined with water to produce a hydrogen rich gas for use in the fuel cell. Methanol is a preferred fuel because it is easy to reform into the anode gas. However, it is to be understood that the invention may be employed with efficacy in non-vehicular applications, particularly where rapid response to a load change is required. The vaporizer may also be employed with efficacy in other reformer type fuel cell systems that employ a liquid fuel other than methanol as, for example, ethanol, gasoline, diesel fuel, etc. Consequently, the invention should not be regarded as limited to vehicular systems or methanol type systems except insofar as expressly so stated in the appended claims.

Figure 1:
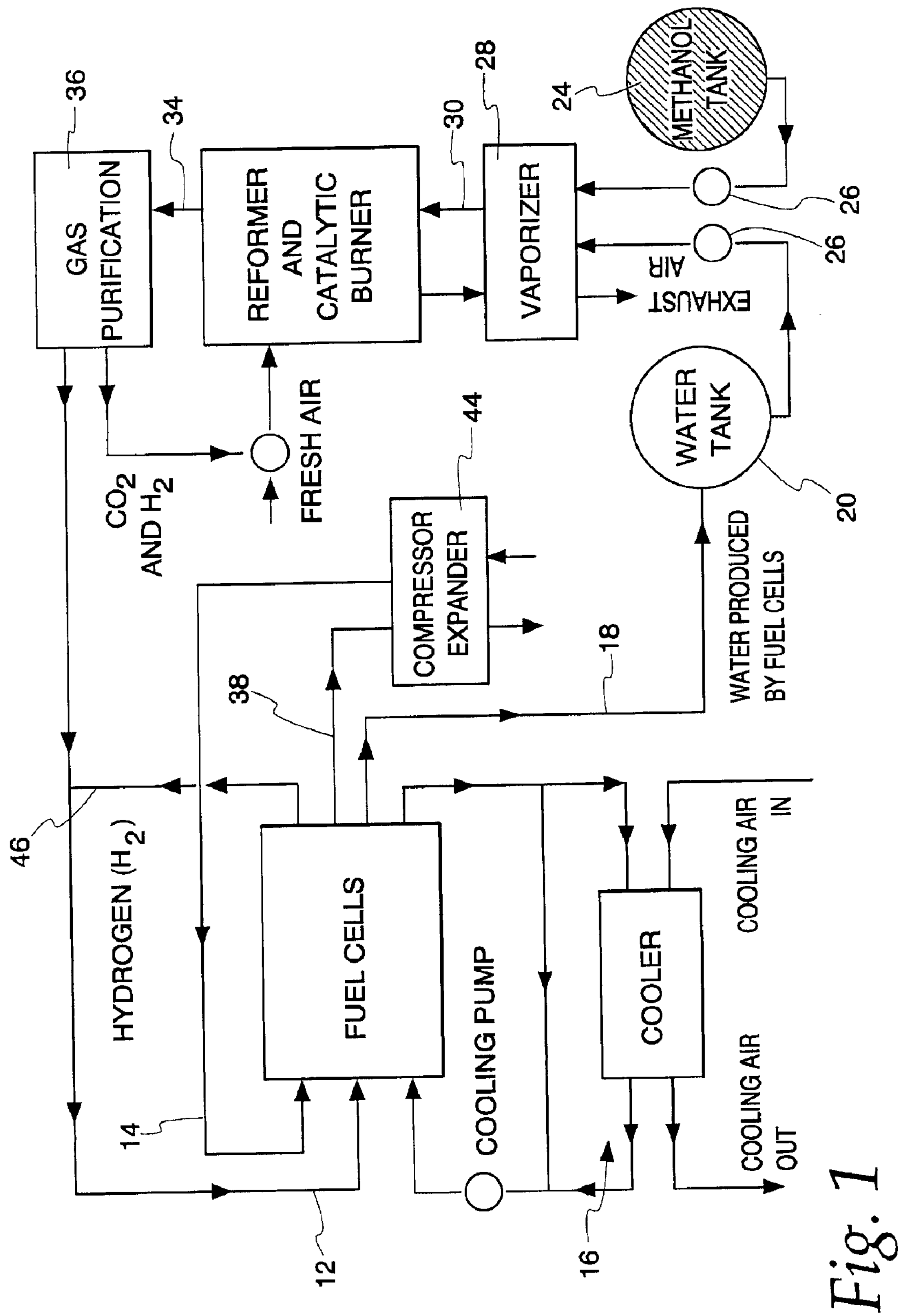
FIG. 1 is a schematic illustrating a typical fuel cell system of the type employing a reformer with which the fuel vaporizer of the present invention may be employed.

Turning now to FIG. 1, one type of fuel cell system embodying a reformer with which the invention may be used is illustrated in FIG. 1. This system is specifically intended to be employed in a vehicle but may be used to advantage in other environments.

The system includes a fuel cell 10 with provision for an anode gas inlet stream on a line 12. The anode gas typically will be hydrogen, carbon dioxide, and water vapor.

The fuel cell also includes an inlet line 14 leading to the cathode side of the fuel cell and through which an oxygen rich stream is received. In the usual case, the stream will be air.

The fuel cell also includes a cooling loop, generally designated 16 as is well known.

The cathode exhaust is discharged on a line 18 which eventually leads to a water tank or reservoir 20. That is to say, water, the product of the chemical reaction within the fuel cell 10, is provided to the water tank 20 for later reuse in the reforming process.

In addition to the water tank 20, the system includes a fuel tank 24 which, in the system shown, contains methanol. Pumps 26 that are electrically driven by battery power during start-up or by the electricity produced by the fuel cell 10 during operation, meter water and methanol in a desired ratio to separate inlets or a common inlet of a fuel vaporizer 28 made according to the invention. The water/methanol mixture is vaporized and discharged on a line 30 to the inlet of a reformer and catalytic burner 32. The reformer and catalytic burner 32 in turn discharges reformate (hydrogen, water, carbon monoxide and carbon dioxide) on a line 34 to a gas purification reactor 36 where the carbon monoxide content of the gas is reduced to the point where it will not poison fuel cell 10. The gas purification reactor 36 discharges to the inlet line 12 to the anode of the fuel cell 10.

The system also includes an exhaust line 38 on which exhaust gas is discharged. The exhaust gas is expanded through a compressor/expander 44 and discharged as exhaust. A recirculation line 46 for hot gas may also be provided.

Electric power generated by the fuel cell 10 is employed, during operation, to drive pumps, motors, etc. within the system as well as to provide electric power for the load to be driven by the system. For start up, battery power may be used. In the case of a vehicular propulsion system, the load will typically be a motor coupled to the vehicle traction system.

Figure 2:
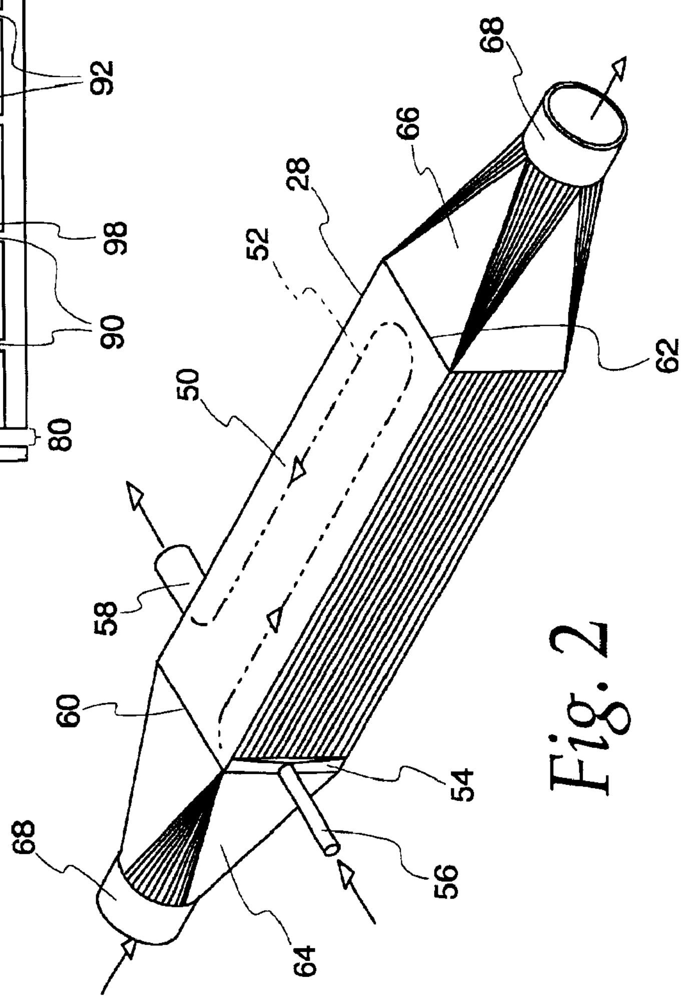
FIG. 2 is a perspective view of a fuel vaporizer made according to the invention.

Turning now to FIG. 2, a preferred form of a fuel vaporizer 28 made according to the invention is illustrated. The same includes a core 50 made up of a series of plates, bars, spacers and fins to be described in greater detail hereinafter. These components define a fuel/water flow path through the vaporizer which is shown schematically by an arrow 52. A liquid fuel inlet to the flow path 52 is provided by a header 54 and a relatively small diameter tube 56 connected thereto. A similar header (not shown) supports a large diameter tube 58 which serves as a vaporized fuel outlet. The difference in size of the tubes 56 and 58 is due to the fact that the fuel and water mix enters the tube 56 as a liquid and thus is at a relatively greater density than the fuel exiting through the outlet tube 58 which is in vapor form. Consequently, to avoid a large pressure drop, because of the greater volumetric flow rate at the outlet tube 58, the outlet tube 58 has a larger cross-sectional area.

The core 50 has opposed ends 60 and 62. The end 60 is an inlet end and includes an inlet header 64. The end 62 is an outlet end and includes an outlet header 66. The header 64 is connected to receive hot gas from the reformer and catalytic burner 32 (FIG. 1) and deliver it through hot gas fluid flow passages that are in heat exchange relation with the flow path 50 which is in the form of a plurality of passages as well. As will be seen, the core 50 is a stack of the previously mentioned components that define alternating fuel/water flow paths and hot gas flow paths. It is to be noted that the inlet and outlet headers 64, 66 for the hot gas are preferably pyramid shaped having a round opening 68 at their apexes and an opposite, open base (not shown) which is in fluid communication with hot gas fluid flow paths (not shown) within the core 50.

Figure 3:
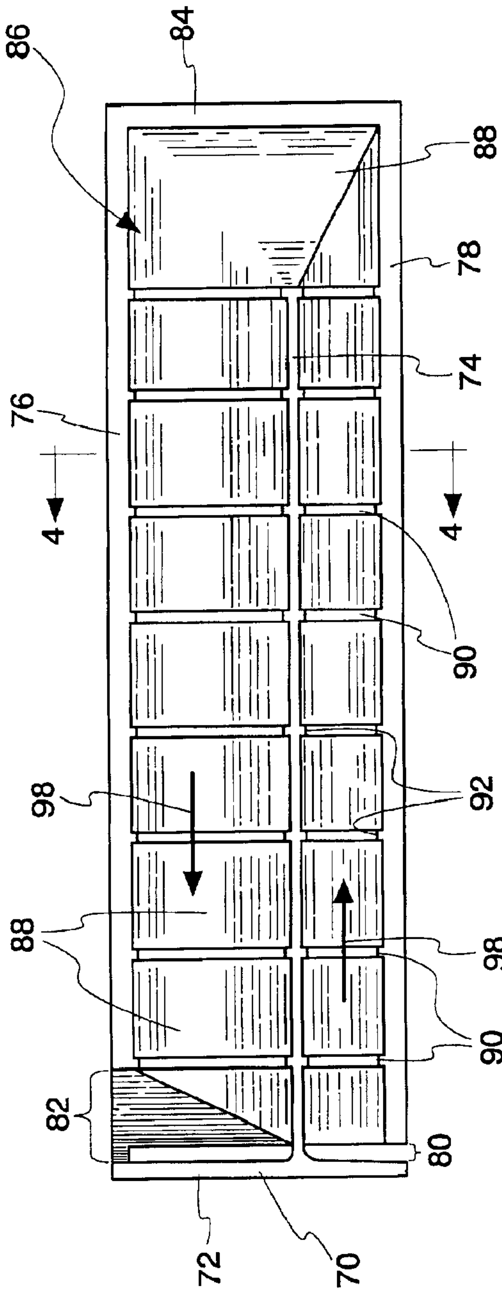
FIG. 3 is a plan view of the structure of fuel side passages employed in the vaporizer.

Turning to FIG. 3, a typical fuel side subassembly constituting a methanol/water flow path defining structure is illustrated. The same includes a T-shaped bar 70 having a top end 72 of the T and an upright 74. The bar 74 extends between two side bars 76 and 78 which are parallel and extend substantially the length of the core 50 (FIG. 2) except for a relatively small break or gap 80 between the bar 78 and the top 72 of the T which aligns with the inlet manifold 54 and a relatively larger break or gap 82 at the end of the bar 76 adjacent the top 72 of the T 70 which aligns with the methanol/water outlet manifold (not shown) which is connected to the outlet tube 58.

At the end of the bars 76 and 78 remote from the top 72 of the T 70, a cross bar 84 is located to seal off such end.

Nestled between the bars 70, 76, 78 and 84 is an undulating spacer, generally designated 86 which is made up of a plurality of spacer sections 88 having the configurations illustrated in FIG. 3. In several instances such as shown at 90, gaps are located between adjacent ones of the spacer sections 88 and small tabs 92 may be provided on the bar 74 as well as the bars 76 and 78 to maintain the gaps 90.

Figure 4:
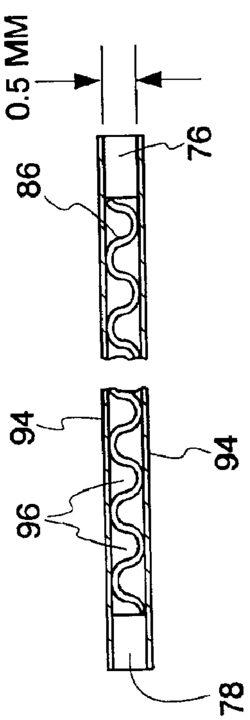
FIG. 4 is an enlarged, sectional view taken approximately along the line 4—4 in FIG. 3.

FIG. 4 is a section taken approximately along the line 4-4 in FIG. 3 illustrating the undulating spacer 86. The spacer 86 extends between the bars 76 and 78 (as well as the bar 74) which is not shown in FIG. 4 and is sandwiched in that location by separator plates 94 which are not illustrated in FIG. 3. The spacer 86 is bonded as by brazing to the separator plates 94. The spacer 86 acts as an internal fin and may be louvered, lanced and offset, a herringbone or any other configuration that allows bonding to the separator plates 94.

In the usual case, corrosion resistant materials such as stainless steel or Inconel are utilized to resist the corrosive effects of the fuel water mixture introduced through the gap 80 from the header 54. As a consequence, a plurality of flow ports or passages 96 are formed between adjacent convolutions of the spacers 86 and provide for fuel flow in the direction illustrated by arrows 98 in FIG. 3.

It will be noted that the bar 74 is not centered on the top 72 of the T 70, but rather, is located to intersect the same at a spot approximately 10% to 50% of the distance from the gap 80 to the gap 82. This provides a minimum of flow resistance to the fuel/water mixture as it vaporizes and increases in volume as a result.

To minimize the mass of fuel located in the fuel passages 52, of which FIGS. 3 and 4 show a single one, the height of the insert is 1.0 mm or less and preferably, about 0.5 mm. This provides a small hydraulic diameter for the ports 96 which typically will be on the order of 0.49 mm. However, where a decrease in response time can be tolerated, the hydraulic diameter may be increased. The lower limit on hydraulic diameter will depend on the required mass flow rate for a given system, the tolerable pressure drop, the total free flow area provided for fuel flow and other like factors.

The gaps 90, in the direction of flow are between 1 and 3 mm and the distance between adjacent ones of the gaps 90 is between 20 and 30 mm. The gaps 90 provide for redistribution of flow and aid in reducing undesirable pulsation in flow. The outside dimensions of the assembly for one embodiment of the invention are illustrated in FIG. 3.

It should be recognized that while the fuel side subassembly has been described as a fabricated structure made up of separators, bars and undulating spacers, the invention does contemplate the use of extruded structures could be employed to provide each pass previously described if the desired relatively small hydraulic diameter for a given system can be obtained.

Figure 5:
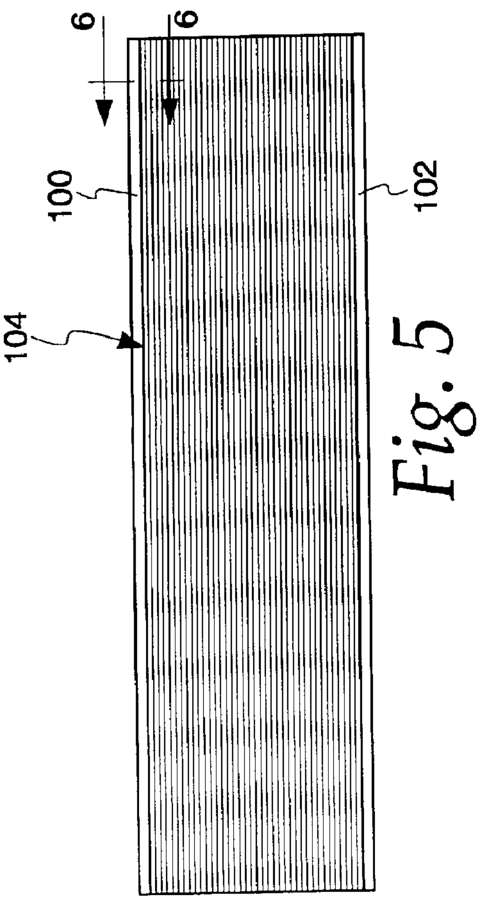
FIG. 5 is a view similar to FIG. 3 but of the hot gas side of the vaporizer.
Figure 7:
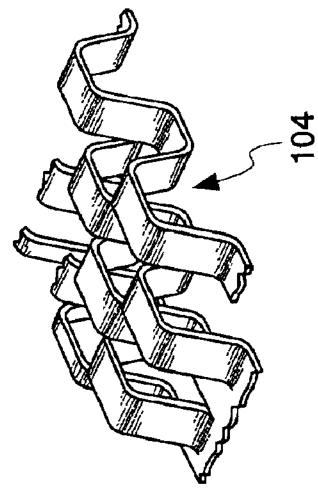
FIG. 7 is a perspective view of a typical lanced and offset fin construction that may be employed in the hot gas side of the vaporizer.
Figure 6:
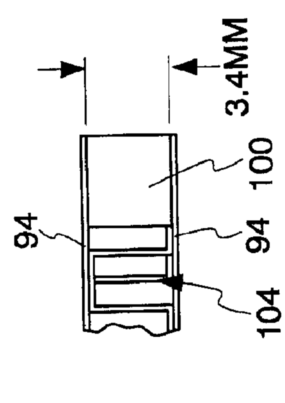
FIG. 6 is an enlarged, fragmentary, sectional view taken approximately along the line 6—6 in FIG. 5.

Turning now to FIG. 5, a typical subassembly defining the hot gas flow passage is illustrated. The same includes spaced, parallel bars 100, 102 between which is nested a lanced and offset fin, generally designated 104, which serves as a turbulator for the hot gas. FIG. 6 fragmentarily illustrates the lanced and offset fin 104 between two separator plates 94 (which are identical to the separator plates 94 in FIG. 4) and may be common with those illustrated in FIG. 4 in most instances as will be described. The fin 104 is sandwiched between the separator plates 94 and brazed thereto. The height of the lanced and offset fin is 3.4 mm in the illustrated embodiment. While lanced and offset fins are known in the art, FIG. 7 illustrates a perspective view of such a fin. In the preferred embodiment, the fin, as mentioned previously, is 3.4 mm high with a fin density of 9 fins per centimeter. Overall dimensions of the hot gas side subassembly which defines the fluid flow passages are illustrated in FIG. 5 and are identical to those shown in FIG. 4.

Figure 8:
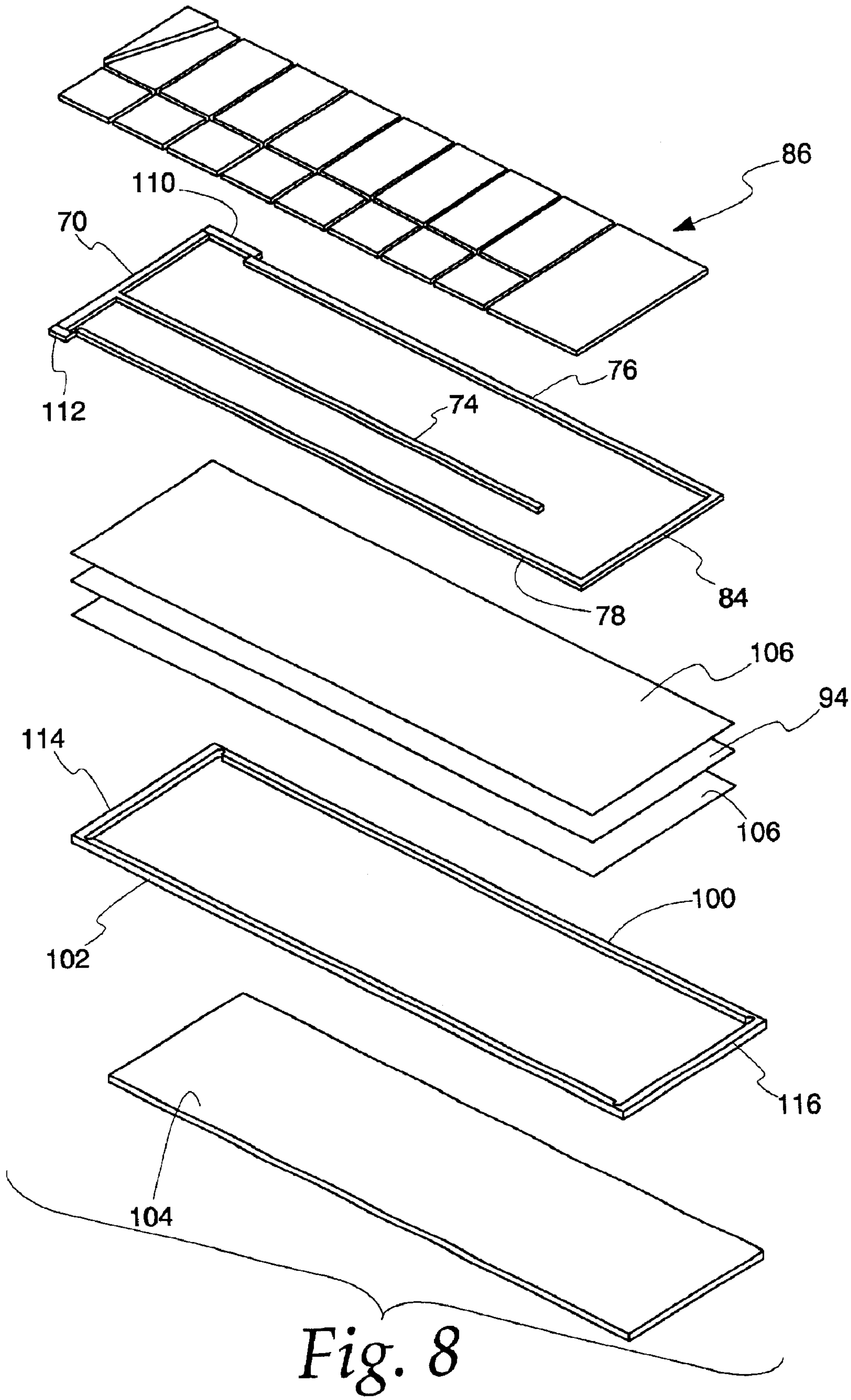
FIG. 8 is an exploded view of part of a core of a vaporizer made according to the invention.

FIG. 8 is an exploded view of a part of a stack of alternating ones of the subassemblies shown in FIG. 3 and FIG. 5 making up the core 50.

To facilitate assembly, braze foil strips 106 are also provided and located to sandwich a separator plate 94 in each instance except for the top and bottom separator plates 94 in the stack defining the core 50 (FIG. 2). The braze foil sheets 106 will not be apparent in the final assembly as such although the residue of braze metal therefrom will be present. If desired, other means of locating braze metal at desired locations may be used, as for example, powder coating, the use of braze clad sheets and the like.

From top to bottom, a separator plate 94 will be provided followed by a braze foil sheet 106. This in turn will be followed by an assembly of the bars 70, 74, 76, 78 with the undulating insert 86 nested between the same as mentioned previously. That structure is then followed by a braze foil sheet 106, a separator plate 94, a further braze foil sheet 106, and then the bars 100, 102 with the fin 104 nestled between the same. That structure, in turn, will be followed by a braze foil sheet 106, a separator plate 94 and another braze foil sheet 106 which in turn is followed by another of the assemblies of the bars 70, 74, 76, 78 with the undulating spacer 86 nested therebetween. That in turn will be followed by a braze foil sheet 106, a separator plate 94, another braze foil sheet 106, and the bars 100 and 102 with the fin 104 nestled between the same. This construction is repeated until the desired height of the stack is virtually complete at which time the last set of bars and spacer 86 for fin 104 is in place which in turn will then be followed by another braze foil sheet 106 and a bottom separator plate 94.

To facilitate assembly, a fixturing tab 110 extends across the gap 82 between the top 72 of the T 70 and the adjacent end of the bar 76. A similar fixturing tab 112 extends across the gap 80 between the bar 76 and the top of the T 72. In a like fashion, fixturing tabs 114 extend between the bars 100 and 102 at the inlet end of the fluid flow passage subassembly while a similar fixturing tab 116 extends between the opposite ends of the bars 100, 102. The fixturing tabs 110, 112, 114, 116 are removed, as by a machining or cutting operation after the entire core 50 has been brazed together.

In addition to the dimensions given previously, typical dimensions for the separator plates 94 and the braze foil sheets 106 (or cladding or coating if used instead of the sheets) are as follows. Their outer dimensions are generally the same as the sub-assemblies which are shown in FIGS. 3 and 5. Typically, the braze foil sheets 106 will have a thickness in the range of about 0.01–0.05 mm, preferably 0.02 mm, while the separator plates 94 will have a thickness of 0.2 mm. Pressure resistance is provided by the fact that the crests of both the undulating spacer 86 and the lanced and offset fin 104 are brazed to the separator plates 94.

With the fixturing tabs removed, the headers 54,64 and 66 as well as the water/methanol outlet header (not shown) are welded to the core 50 at the locations mentioned previously.

In the usual case, a water and methanol mixture will be introduced through the inlet tube 56, that is, through a single inlet. However, it is to be understood that multiple inlets may be used if desired. It should also be understood that it is possible to utilize the vaporizer of the present invention to vaporize only the hydrogen containing fuel and not the water which may be vaporized in a separate vaporizer with the outlet streams then combined prior to their admission to the reformer 32.

Figure 9:
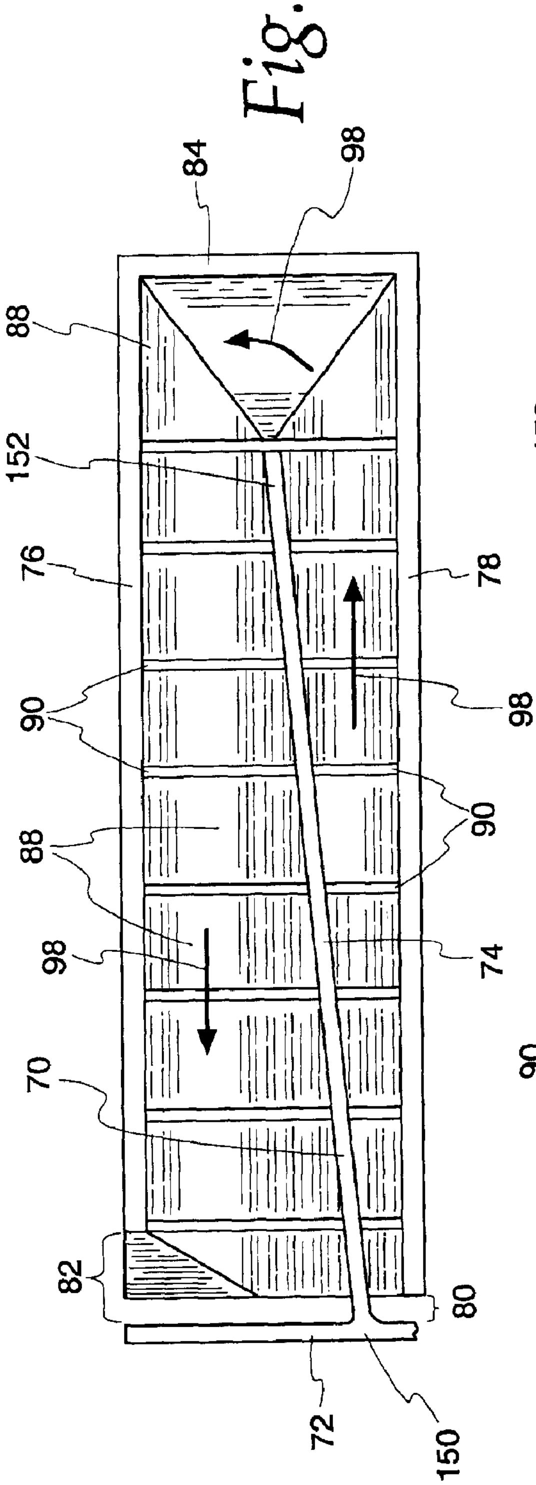
FIG. 9 is a plan view of an alternate embodiment of the structure of the fuel side passages.
Figure 10:
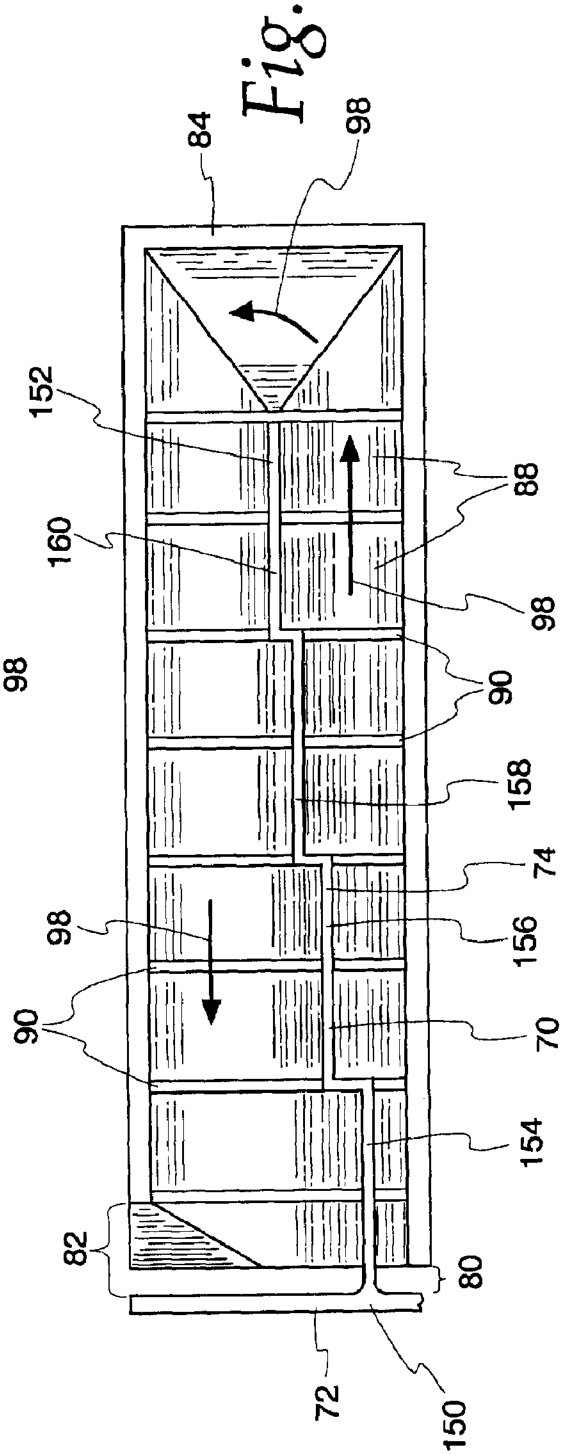
FIG. 10 is a plan view of still another alternate embodiment of the structure of the fuel side passages.

Alternative embodiments of the fuel side structure are illustrated in FIGS. 9 and 10. In the interest of brevity, where components similar or identical to those previously described have been used, they will not be redescribed and the same reference numerals will be employed.

In basic terms, the embodiments shown in FIGS. 9 and 10 are intended to make further provision for the fact that the incoming fuel, a mixture of water and methanol partly in vapor form and partly in liquid form, will have a higher density than the outgoing fuel, which will all be in vapor form. In order to minimize flow resistance, the embodiments in FIGS. 9 and 10 have an ever expanding cross-sectional area as one moves from fuel inlet 80 to the fuel outlet 82. In the embodiment illustrated in FIG. 9, the upright 74 of the T-shaped bar 70 joins with the top 72 of the T-shaped bar 74 at a location that is about 10% of the distance from the inlet 80 to the outlet 82 along the top 72 of the T-shaped bar 74. This junction is shown at 150 in FIG. 9.

The opposite end of the upright 74 is designated 152 and terminates at a location that is approximately mid-way between the bars 76 and 78 (as measured along the top 72 of the T-shaped bar 74) and spaced from the bar 84 by a distance approximately as in the embodiment of FIG. 3. As a consequence, it will be appreciated that the cross-sectional area of the flow path for a flow direction in the arrows 98 will continually increase from the inlet 80 to the outlet 82 so that as the fuel mixture density reduces as a result of vaporization of the liquid phase and heating of the vapor phase decreases its density (increases its volume), the same readily flows through the expanding flow path without measurably increasing flow resistance.

The embodiment of FIG. 10 is generally similar but in this case, the upright 74 is divided into a series of connected steps shown at 154, 156, 158 and 160. Thus, in the embodiment of FIG. 10, the increase in cross-sectional area continues from the inlet 80 to the outlet 82 but in a stepwise fashion as opposed to the continuously occurring increase that occurs in the embodiment of FIG. 9.

In some cases, it may be desirable to form the various bars as flanges or ribs in the separator plates which abut one another or another separator plate and which are bonded thereto; and references herein to "bars" are intended to encompass such structures.

Nonetheless, it will be recognized that in both embodiments, the increasing cross-sectional area of the fuel flow path to accommodate the decreasing density of the fuel mixture to eliminate high flow resistance is present.

The foregoing results in a construction wherein the fuel/water stream is introduced adjacent the hot gas inlet so as to immediately be subjected to heat exchange with the hot gas when the latter is at its highest temperature. The same then flows downstream in concurrent relation to the hot gas until a point generally adjacent the hot gas outlet 66 where the fuel/water reverses direction to flow countercurrent to the hot gas flow and finally to the fuel outlet. That is to say, the presence of the T 70 in the fuel passage subassembly provides a multi-pass flow path for the fuel with the upstream most pass entering at the point of highest temperature of the hot gas and the downstream most pass of the fuel flowing countercurrently to also be discharged at the point where the hot gas is at its highest temperature. This is thought to provide a highly beneficial effect in that because the flow pass arrangement results in the highest temperature differential between the fuel and the hot gas at the point of entrance of the fuel as a liquid, it is more rapidly vaporized than if a different flow regime were to be employed. Consequently, the density of the fuel stream is immediately lowered considerably by rapid vaporization of the fuel which in turn means that the mass of fuel contained within the vaporizer 28 at any given instant is minimized. This provides for a much more rapid response of the fuel cell to a change in command as, for example, when an operator of a vehicle utilizing the system for propulsion steps on the equivalent of a gas pedal in a conventional internal combustion engine propulsion system.

It will also be appreciated that the extremely small height and hydraulic diameter of the ports 96 defining the fuel flow passages results in a minimum volume for fuel, thereby minimizing the mass of fuel that is in the vaporizer 28, whether in gaseous or liquid form. Again, the response is maximized.

Importantly, the use of a lanced and offset fin such as the fin 104 in the fluid flow passages for the hot gas provides excellent turbulation within those passages thereby maximizing heat transfer and in turn permitting the volume of the fuel side of the vaporizer to be minimized for the same purpose.

It should be noted that the invention is not limited to the use of tail gas as a heat source. Any gas at an elevated temperature and having sufficient heat capacity to perform the required vaporization may be utilized. In fact, in some instances, particularly during the start-up of the system, methanol from the tank 24 may be utilized to produce the hot gas needed to vaporize the fuel.

We claim:

1. A fuel vaporizing system for use in a fuel cell propulsion system including a source of liquid fuel;

a source of water;

a source of fluid at an elevated temperature;

a heat exchanger for vaporizing fuel and water and delivering the resulting vapor to a reformer, said heat exchanger having an inlet for said fluid, an outlet for said fluid spaced therefrom, the inlet being connected to said fluid source, a fluid flow path extending between said fluid inlet and said fluid outlet, and having an upstream end at said fluid inlet and a downstream end at said fluid outlet, a fuel/water liquid inlet and a fuel/water vapor outlet spaced therefrom and connected by a plurality of elongated fuel/water flow paths that are in heat exchange relation with said fluid flow path, said fuel/water inlet being connected to said fuel and water sources and located adjacent said upstream end of said fluid flow path; and wherein said fuel/water flow paths are multiple pass flow paths with an upstream most one of said fuel/water flow paths flowing concurrent with said fluid flow path and a downstream most one of said fuel/water flow paths flowing countercurrent to said fluid flow path.

2. The fuel vaporizing system of claim 1 wherein said heat exchanger is a plate heat exchanger including a stack of separator plates defining configuration of fluid flow paths and fuel/water flow paths in alternating relation, and turbulators in said fluid flow paths.

3. The fuel vaporizing system of claim 2 wherein said fuel/water flow paths are flattened and have a major dimension and a minor dimension, said minor dimension being 1.0 mm or less.

4. The fuel vaporizing system of claim 3 wherein said minor dimension is about 0.5 mm.

5. The fuel vaporizing system of claim 3 wherein said fuel/water flow paths each include an undulating spacer.

6. The fuel vaporizing system of claim 5 wherein said undulating spacer includes a plurality of spacer sections separated by gaps.

7. A fuel vaporizing system for use in a fuel cell propulsion system including a source of liquid fuel;

a source of water;

a source of fluid at an elevated temperature;

a heat exchanger for vaporizing fuel and water and delivering the resulting vapor to a reformer, said heat exchanger having an inlet for said fluid, an outlet for said fluid spaced therefrom, the inlet being connected to said fluid source, a fluid flow path extending between said fluid inlet and said fluid outlet, and having an upstream end at said fluid inlet and a downstream end at said fluid outlet, a fuel/water liquid inlet and a fuel/water vapor outlet spaced therefrom and connected by a plurality of elongated fuel/water flow paths that are in heat exchange relation with said fluid flow path, said fuel/water inlet being connected to said fuel and water sources and located adjacent said upstream end of said fluid flow path; and wherein said fuel/water flow paths are flattened and have a major dimension and a minor dimension, said minor dimension being 1.0 mm or less.

* * * * *